United States Patent
Lyons, III et al.

(10) Patent No.: US 6,350,176 B1
(45) Date of Patent: Feb. 26, 2002

(54) HIGH QUALITY OPTICALLY POLISHED ALUMINUM MIRROR AND PROCESS FOR PRODUCING

(75) Inventors: James J. Lyons, III, Sharpsburg; John J. Zaniewski, Berlin, both of MD (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 09/492,085

(22) Filed: Jan. 27, 2000

Related U.S. Application Data

(60) Provisional application No. 60/121,519, filed on Feb. 1, 1999.

(51) Int. Cl.$^7$ .................................................. B24B 1/00
(52) U.S. Cl. ............................ 451/41; 451/37; 451/57
(58) Field of Search ............................... 451/37, 57, 41

(56) References Cited

U.S. PATENT DOCUMENTS

| | | | |
|---|---|---|---|
| 4,115,177 A | | 9/1978 | Nelson |
| 4,431,268 A | | 2/1984 | Ohno et al. |
| 4,457,587 A | | 7/1984 | Katayama et al. |
| 4,482,209 A | | 11/1984 | Grewal et al. |
| 4,599,827 A | | 7/1986 | Goodwin |
| 5,095,664 A | * | 3/1992 | Zayhowski ................ 451/57 X |
| 5,383,472 A | | 1/1995 | Devlin et al. ............... 128/771 |
| 5,640,282 A | | 6/1997 | Ise et al. |
| 5,779,871 A | * | 7/1998 | Gillich .......................... 205/116 |
| 5,897,426 A | * | 4/1999 | Somekh ..................... 451/57 X |
| 5,913,712 A | * | 6/1999 | Molinar ..................... 451/57 X |
| 5,978,133 A | | 11/1999 | Gillich |
| 6,051,203 A | * | 4/2000 | Solntsev et al. ............ 423/633 |
| 6,077,337 A | * | 6/2000 | Lee ................................ 106/3 |
| 6,099,604 A | * | 8/2000 | Sandhu et al. ................. 51/307 |
| 6,120,354 A | * | 9/2000 | Koos et al. ..................... 451/41 |
| 6,218,306 B1 | * | 4/2001 | Fishkin et al. ............... 438/692 |

OTHER PUBLICATIONS

Diamonds Turn Infrared Morros Smooth; Daniel Vukobratovich et al; Optoelectronics World, pp. S25–S28; Oct. 1998.

* cited by examiner

Primary Examiner—Joseph J. Hail, III
Assistant Examiner—Anthony Ojini
(74) Attorney, Agent, or Firm—Chan K. Park

(57) ABSTRACT

A new technical advancement in the field of precision aluminum optics permits high quality optical polishing of aluminum monolith, which, in the field of optics, offers numerous benefits because of its machinability, lightweight, and low cost. This invention combines diamond turning and conventional polishing along with india ink, a newly adopted material, for the polishing to accomplish a significant improvement in surface precision of aluminum monolith for optical purposes. This invention guarantees the precise optical polishing of typical bare aluminum monolith to surface roughness of less than about 30 angstroms rms and preferably about 5 angstroms rms while maintaining a surface figure accuracy in terms of surface figure error of not more than one-fifteenth of wave peak-to-valley.

28 Claims, 3 Drawing Sheets

HIGH QUALITY OPTICALLY POLISHED ALUMINUM MIRROR AND PROCESS FOR PRODUCING

CROSS-REFERENCES TO RELATED APPLICATIONS

This application now formalizes and incorporates herein by reference Provisional Application Ser. No. 60/121,519, "Process for producing high quality optically polished surface on bare aluminum substrates" James J. Lyons III, et al., filed on Feb. 1, 1999. Applicant claims the priority date thereof under 35 U.S.C. 119(e).

ORIGIN OF THE INVENTION

The invention described herein was made by employees of the United States Government. The invention may be manufactured and used by or for the governmental purposes without the payment of royalties thereon or therefor.

FIELD OF THE INVENTION

The present invention relates to polishing an optic surface and more particularly to polishing an optic surface on an aluminum monolith.

BACKGROUND OF THE INVENTION

Metallic mirrors have been widely used for instruments in space and military applications. System performance of the instruments is largely dependent upon the reflective surface of the mirror. Performance of the optical mount, and its thermal and mechanical characteristics also have effects on the performance of the optical component. In actuality the optical mount has a significant impact on performance of the optical system in achieving objectives of any scientific and engineering experiment. When both optical mount and mirror substrate are of the same material there is uniformity of thermal properties. Also the high thermal conductivity of a metal mirror helps decrease cooling time in cryogenic applications.

Many spacecraft systems utilize aluminum materials for structural components in cases of cold or cryogenic use. Aluminum materials may also be used for mirrors as aluminum offers numerous benefits because of its machinability, lightweight, and low cost.

Due to light scattering which results from poorly polished surfaces, however, bare aluminum cannot be readily implemented as an acceptable mirror material for UV, IR and visible applications. The scattering lowers the signal-to-noice ratio and throughput.

Existing technology attempts to remedy this dilema by electroplating a thin layer of electroless nickel to the entire component surface and then optically polishing the plated nickel. The result creates a tradeoff whereby surface roughness is decreased while thermal and mechanical stability of the optic are severely compromised at all but room temperatures. This is especially true for aluminum optics that have been light-weighted. Further complicating matters is the fact that the mount is usually an integrally machined part of an aluminum optic. While these characteristics are great for dimensional requirements and ease of design, they create havoc on the optical performance once all surfaces are evenly plated with nickel. The electroless nickel platings also can cause bi-metalic stresses to deteriorate optical performance. Another problem of plating aluminum with electroless nickel is that manufacturing costs grow because nickel polishes more slowly than conventional optical materials.

One prior technique has overcome such problems yet provides inferior optical performace to one proposed by the present invention. For example, see "Diamonds turn infrared mirrors smooth", by Daniel Vukobratovich, et al, Optoelectronics World, page S25–S28, October 1998. The prior technique plates an aluminum substrate with an amorphous layer of high-purity aluminum. Then the plated substrate is diamond-turned to produce a mirror with surface roughness of 30 angstroms rms with surface accuracy in terms of surface figure error of 0.380 wave peak-to-valley. This plated substrate is theoretically bimetallic and should experience the bimetallic deformation to some degree. By comparison the present invention provides an aluminum mirror of about 5 angstroms rms surface roughness with surface accuracy in terms of surface figure error as low as one-fifteenth of a wave peak-to-valley without any bimetallic deformations.

In addition to superior optical performance, this invention provides the following advantages by eliminating the electroless nickel plating from the aluminum mirrors:

(1) Drastic cost savings during fabrication.
(2) Reduced risk associated with polishing through nickel to the aluminum. This requires that the part be stripped of the remaining nickel and re-plated. To do so, the optical surface must again be prepared for plating because the stripping procedure etches the aluminum.
(3) Drastic performance improvements. Properly heat-treated bare aluminum performs well in cryogenic conditions without the nickel plating.
(4) Reduced cost of final component characterizations. Plated mirrors that show abnormalities are often tested and retested to determine the impact on the system performance. If the problem is identified to be with the nickel plating as is often the case, then the process must be completely repeated by stripping the mirror and starting over.

Properly implemented, therefore, the proposed innovation will eliminate many of the associated problems now common with current aluminum mirror technology, delivering aluminum optics with superior accuracy.

Accordingly, it is an object of this invention to provide a high quality optically polished aluminum mirror.

It is another object of this invention is to provide a process for producing the high quality optically polished surface on an aluminum monolith.

SUMMARY OF THE INVENTION

This invention presents a high quality optically polished aluminum mirror and a novel method of optically polishing aluminum monolith in a conventional polishing manner by employing modern techniques with a combination of compatible ingredients. In other words, this invention combines diamond turning and conventional polishing along with newly adopted materials for the polishing to accomplish a significant improvement in surface precision of bare aluminum for optical purposes.

This present invention provides an aluminum mirror of less than about 30 angstroms rms and preferably about 5 angstroms rms surface roughness with surface accuracy in terms of surface figure error as low as one-fifteenth of a wave peak-to-valley. The inventors used commercial grade aluminum, for example, 6061T6 aluminum, to produce the aluminum mirror presented by this invention. Inventors believe that further polishing of the aluminum mirror mentioned above with the polishing process proposed by this invention can produce an aluminum mirror of higher quality.

The polishing process proposed by this invention can be applied to other optically feasible substrates including glass, nickel, stainless steel, and many other glasses or metal materials.

Step one of this innovative polishing method is pre-polishing to produce a pre-polished surface having a surface roughness of not more than about 100 angstroms rms with a surface accuracy in terms of surface figure error of not more than about one-half of a wave peak-to-valley.

The pre-polishing of the surface of the metallic monolith may be effected by diamond turning. The process of diamond turning is a precision method of producing accurate mirrored surfaces of optical quality (for some wavelengths) on bare aluminum and other materials. It is successful because the turning or cutting action of the sharp diamond tool serves to peel thin layers of aluminum from the surfaces at such small portions as to produce a polished finish whereby other machining processes actually tear the material away from the substrate. The amount of material removed on the typical final cut is 0.0001 inch. The diamond turning process allows surface figure errors of approximately 0.5 of a wave peak-to-valley over components up to four inches in diameter and surface roughness of generally 100 angstroms. The precision degrades slightly as the size of the component grows beyond four inches.

Following the pre-polishing process, the polishing method proceeds with fabrication of a polisher. To fabricate the polisher, select grade of pitch used exclusively for optical fabrication is melted and poured onto a cast iron lap. The pitch is allowed to cool, and then shaped and grooved according to the optician's discretion. Once fabricated, the polisher is installed on a machine spindle, which is a part of a polishing tool assembly. The polishing process continues with applying an appropriate amount of a polishing agent to the surface of the polisher and placing the optical monolith onto the polisher. A pivot pin is then lowered into a pre-drilled small hole in the back of the optical monolith, and the assembly is set to motion. This method of polishing is called random motion polishing. That is, as the machine rotates the polisher and the optical monolith also rotate while the pivot pin passes back and forth over the polisher at a predetermined distance. Geometry of the assembly is such that all points of the polisher and all points of the optical substrate see the same amount of surface feet per minute of contact ensuring even material removal from the optical component. This polishing continues until an acceptable surface figure error with surface roughness is achieved.

The material used as a polishing agent is different from those of normal polishing materials. The polishing agent employed in the present invention comprises an aqueous dispersion of abrasive particles, a catalyst, and organic solvent. The best mode of this invention employs india ink as a polishing agent.

India ink is a solvent based black ink, which is being used in fields other than printing. For example, U.S. Pat. No. 5,383,472, which is a biology related invention, utilizes the india ink to handle biopsy tissue specimen.

Based on analysis conducted by the inventor the india ink comprises carbon black, ammonium hydroxide, phenol, ethylene glycol and water, all of which provide suitable interactions between the polisher and the surfaces of bare aluminum monolith to produce high quality optical surface thereon. Thus, the polishing agent may be replaced with a mixture of carbon black, ammonium hydroxide, phenol, ethylene glycol and water, the mixing proportions of the materials are 7–8%, 1–2%, 0.2–1%, 1–2% and 85–90% by weight, respectively, based on the total weight of the polishing agent.

The polishing process may be repeated with the polishing agent that is gradually diluted with water. The mixing proportions of the polishing agent and diluting water are 100–50% and 0–50% by weight, respectively, based on the total weight of the diluted polishing agent.

In one preferred embodiment, this invention also employs diamond particles for refining the pre-polished surface of the metallic monolith. Diamond particles, whose size is within the ranges of 0.25 to 0.5 microns for this invention, are sprinkled on the surface of the polisher, which is coated with the polishing agent. Then, for the refining process, random motion polishing is performed for about 15 minutes to get rid of diffraction (i.e. rainbow effect) on the aluminum monolith to be polished.

After the polishing process or the refining process with diamond particles and before measuring the surface of the metallic monolith for verifying whether predetermined values of surface roughness and surface accuracy have been obtained, the aluminum monolith needs to be cleaned. This cleaning process removes any residue of the polishing agent and diamond particles from the aluminum monolith and the polisher. The cleaning process involves water, a cleaning liquid comprising ammonia and water, paper towels, and a solvent such as acetone. The cleaning process is performed in the following sequence: (1) deactivating the polishing tool assembly,(2) removing the aluminum monolith from the polisher, (3) spraying a cleaning liquid over entire surface of the aluminum monolith, (4) allowing the aluminum monolith to dry, (5) rinsing the aluminum monolith with a solvent, and, and (6) wiping the polisher using cold water and a paper towel.

The polishing process with the polishing agent is repeated until the surface of the aluminum monolith has met predetermined values of surface roughness and surface accuracy.

DETAILED DESCRIPTION OF PREFERRED EMBODIMENTS OF THE INVENTION

Figure 1:
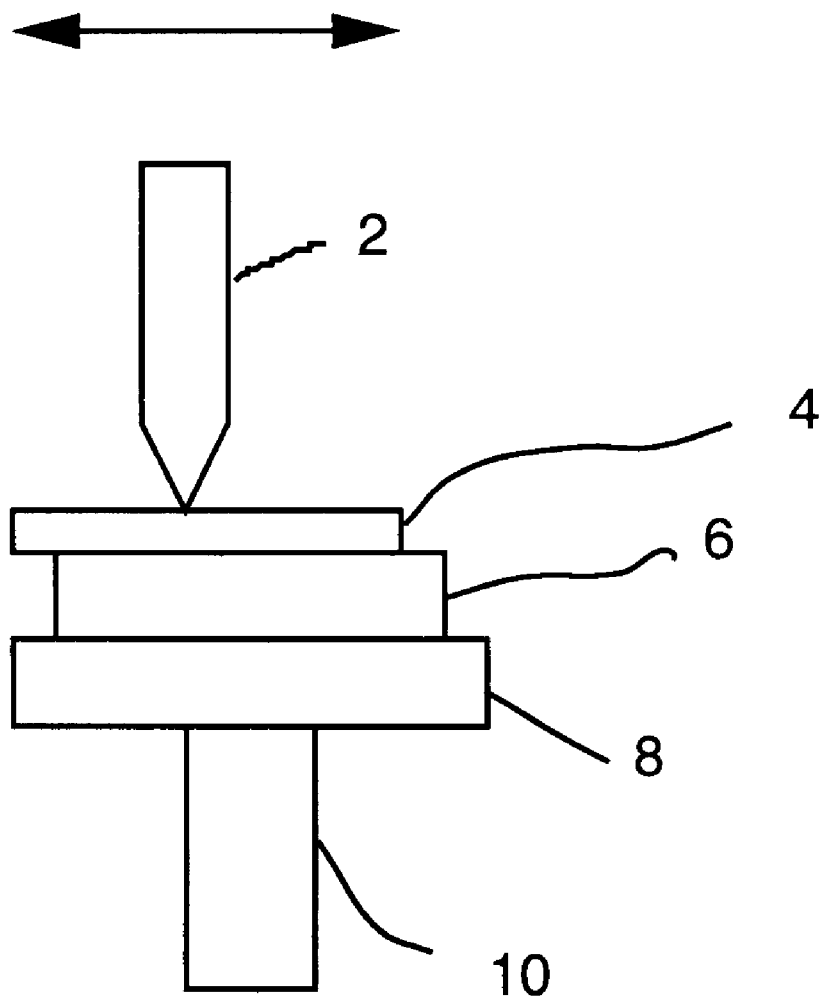
FIG. 1 is a view of the polishing tool assembly.

Referring to FIG. 1, the polishing operation is performed by the precise assembly of components to create a polishing tool assembly 100. A select grade of pitch used exclusively for optical fabrication is melted and poured on a cast iron lap 8. The pitch is allowed to cool and then shaped and grooved according to the optician's discretion. The pitch fabricated in this manner is referred to as a polisher 6. Once complete, the polisher 6 is installed on the machine spindle 10. The optician then applies the appropriate amount of a polishing agent to the surface of the polisher 6, and places the aluminum monolith 4 onto the polisher 6.

Figure 2:
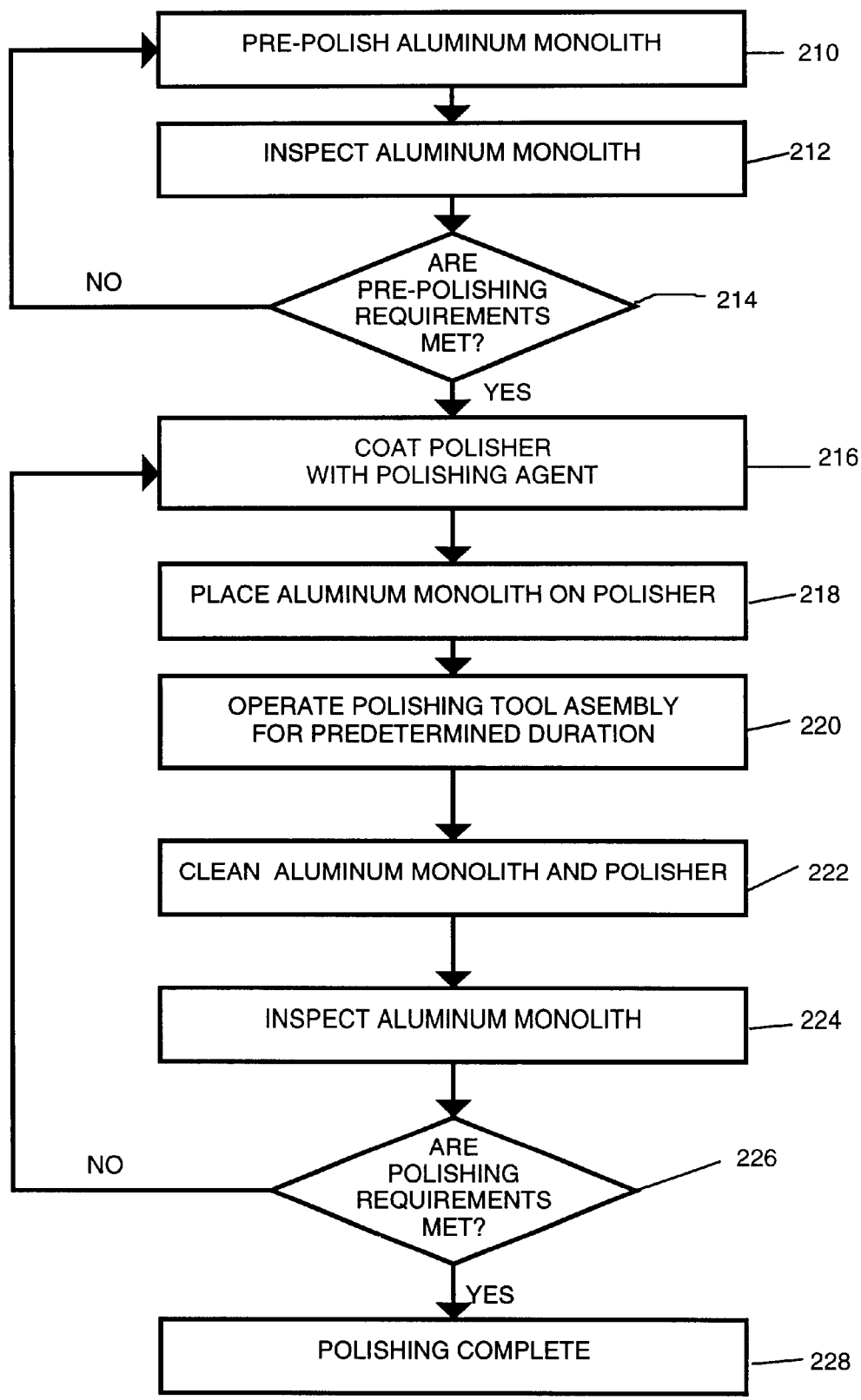
FIG. 2 is a flow chart of one preferred process for producing high quality optically polished surface on an aluminum monolith according to the invention.

Referring to FIG. 2, it is one of the preferred embodiments of producing high quality optically polished surface on an aluminum monolith according to the invention. Pre-polishing (Step 210) is performed until the surface of the aluminum monolith obtains a surface accuracy of 0.5 of a wave peak-to-valley and surface roughness of 100 angstroms rms. Diamond turning is one of the methods that can accomplish the surface accuracy and the surface roughness.

A polishing agent is applied to the surface the polisher 6 of the polishing tool assembly 100 (Step 216). The polishing agent provides lubrication for the aluminum monolith to be polished. During the polishing operation (Step 220) of the polishing tool assembly 100, the polisher 6 should be maintained to be wet with the polishing agent.

Once the polisher 6 is coated with the polishing agent, the aluminum monolith 4 is placed on the polisher. Then the pivot pin 2 is lowered into a small pre-drilled hole in the back of the monolith 4, and the assembly 100 is set to motion. As the is machine spindle 10 rotates, the polisher 6 and the metal substrate 4 also rotate while the pivot pin 2 passes back and forth over the polisher 6 at a pre-determined distance. The geometry is such that all points of the polisher 6 and all points of the metal substrate 4 see the same amount of surface feet per minute of contact resulting in event material removal. This method of polishing is called random motion polishing. The polishing operation (Step 220) is performed for a predetermined duration. The aluminum monolith 4 is inspected (Step 224) to determine if acceptable surface figure and roughness are achieved.

After the polishing operation (Step 220) and before the measuring operation (step 224), which is to measure the surface of the metallic monolith for verifying whether predetermined values of surface roughness and surface accuracy have been obtained, the aluminum monolith must be cleaned (Step 224) to remove the polishing agent from the aluminum monolith 4 and the polisher 6. This cleaning process (Step 224) removes any residue of the polishing agent which might degrade on the aluminum monolith 4 and the polisher 6. The cleaning process (Step 224) involves water, a cleaning liquid comprising ammonia and water, paper towels, and a solvent such as acetone, and is performed in the following sequence: (1) deactivating the polishing tool assembly 100,(2) removing the aluminum monolith 6 from the polishing tool assembly 100, (3) spraying a cleaning liquid over entire surface of the aluminum monolith 4, (4) allowing the aluminum monolith 4 to dry, (5) rinsing the aluminum monolith 4 with a solvent, and (6) wiping the polisher 6 using cold water and a paper towel.

The polishing process with the polishing agent (step 216 through 224) is repeated until the surface of the aluminum monolith has met predetermined values of surface roughness and surface accuracy.

Figure 3:
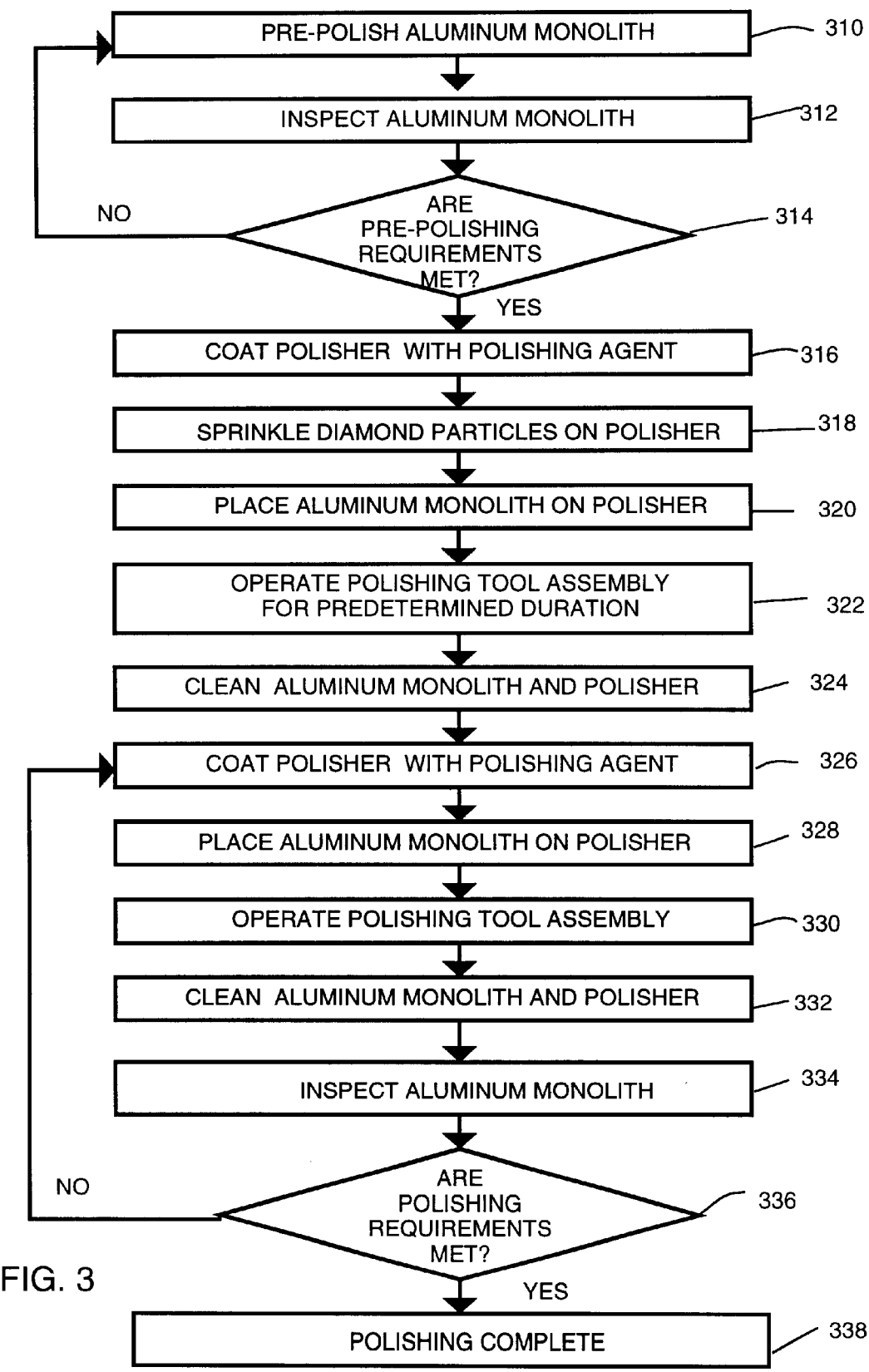
FIG. 3 is a flow chart of another preferred process for producing high quality optically polished surface on an aluminum monolith according to the invention.

Referring to FIG. 3, it is another preferred embodiment of producing high quality optically polished surface an aluminum monolith according to the invention. Pre-polishing (Step 310) is performed until the surface of said metal substrate is of surface accuracy of 0.5 of a wave peak-to-valley and surface roughness of 100 angstroms rms. Diamond turning is one of the methods that can accomplish the surface accuracy and the surface roughness.

A polishing agent is applied to surface the polisher 6 of the polishing tool assembly 100 (Step 316). The polishing agent provides lubrication for the aluminum monolith to be polished. During the polishing operation (Step 322) of the polishing tool assembly 100, the polisher 6 should be covered with the polishing agent.

Diamond particles are sprinkled (Step 318) on the surface of the polisher 6, which is coated with the polishing agent in step 316. Then the aluminum substrate 4 is placed on the polisher 6 (Step 320). Next the pivot pin 2 is lowered into a small pre-drilled hole in the back of the substrate 4, and the assembly 100 is set to motion (Step 322) for about 15 minutes.

To remove the diamond particles and the polishing agent from the metal substrate 4 and the polisher 6, cleaning (Step 324) is performed in the following sequence: (1) deactivating the polishing tool 100,(2) removing the metal substrate 6 from the polishing tool 100, (3) spraying a cleaning liquid over entire surface of the metal substrate 4, (4) allowing the metal substrate 4 to dry, (5) rinsing the metal substrate 4 with a solvent, and(6) wiping the polishing tool 100 using cold water and a paper towel.

Again the polishing agent is applied to surface the polisher 6 of the polishing tool 100 (Step 316). During the polishing operation (Step 322) of the polishing tool 100, the polisher 6 should be maintained to be wet with the polishing agent.

Once the polisher 6 is wet with the polishing agent, the aluminum monolith 4 is placed on the polisher 6. Then the pivot pin 2 is lowered into a small pre-drilled hole in the back of the aluminum monolith 4, and the assembly 100 is set to motion. As the machine spindle 10 rotates, the polisher 6 and the metal substrate 4 also rotate while the pivot pin 2 passes back and forth over the polisher 6 at a pre-determined distance. The geometry is such that all points of the polisher 6 and all points of the metal substrate 4 see the same amount of surface feet per minute of contact resulting in event material removal. The polishing operation (Step 330) is performed for a predetermined duration. The aluminum monolith 4 is inspected (Step 332) to determine if acceptable surface figure and roughness are achieved.

After the polishing operation (Step 330) and before the measuring operation (step 334), which is to measure the surface of the metallic monolith for verifying whether predetermined values of surface roughness and surface accuracy have been obtained, the aluminum monolith needs to be cleaned (Step 332) to remove the polishing agent from the aluminum monolith 4 and the polisher 6. This cleaning process (Step 332) removes any residue of the polishing agent which might degrade on the aluminum monolith rate 4 and the polisher 6. The cleaning process (Step 332) involves water, a cleaning liquid comprising ammonia and water, paper towels, and a solvent such as acetone, and is performed in the following sequence: (1) deactivating the polishing tool assembly 100, (2) removing the aluminum monolith 6 from the polishing tool assembly 100, (3) spraying a cleaning liquid over entire surface of the aluminum monolith 4, (4) allowing the aluminum monolith 4 to dry, (5) rinsing the aluminum monolith 4 with a solvent, and(6) wiping the polisher 6 using cold water and a paper towel.

The polishing process with the polishing agent (step 326 through 334) is repeated until the surface of the aluminum monolith has met predetermined values of surface roughness and surface accuracy.

What is claimed is:

1. A process for producing an optical surface on a metallic monolith, which process comprises:

providing a metallic monolith;

pre-polishing a surface of the metallic monolith to produce a pre-polished surface having a surface roughness of not more than 100 angstroms rms with a surface accuracy in terms of surface figure error of not more than about one-half of a wave peak-to-valley;

polishing the pre-polished surface with a polishing agent comprising an aqueous dispersion of abrasive particles, a catalyst, and an organic solvent to produce a polished surface having a predetermined surface roughness with a surface accuracy; and cleaning the polished surface to remove the polishing agent therefrom.

2. The process of claim 1 including the additional steps of
i. diluting said polishing agent with water;
ii. polishing the pre-polished surface with said diluted polishing agent; and
iii. sequentially repeating steps i and ii to produce a polished surface having a surface having a predetermined surface roughness with a surface accuracy,
wherein the mixing proportions of said polishing agent and said diluting water are 100–50% and 0–50% by weight, respectively, based on the total weight of the diluted polishing agent.

3. The process of claim 1, wherein the pre-polishing of the surface of the metallic monolith is effected by diamond turning.

4. The process of claim 3, wherein the polishing agent comprises carbon black, ammonium hydroxide, phenol, ethylene glycol and water.

5. The process of claim 4, wherein carbon black, ammonium hydroxide, phenol, ethylene glycol and water are present in the polishing agent in amounts sufficient to provide the following respective percentages by weight, based on the total weight of the polishing agent: 7–8%, 1–2%, 0.2–1%, 1–2%, and 85–90%.

6. The process of claim 5, wherein the polishing agent is india ink.

7. The process of claim 3, wherein the polishing of the pre-polished surface with the polishing agent is effected by the method of random motion polishing.

8. The process of claim 3, wherein the metallic monolith is aluminum.

9. The process of claim 8, wherein the aluminum is 6061T6 aluminum.

10. The process of claim 1 including the additional step of:
cleaning said metallic monolith and a polisher; and
measuring the surface of said metallic monolith for verifying whether predetermined values of surface roughness and surface accuracy have been obtained.

11. The process of claim 10 wherein said step of cleaning said metallic monolith and the polisher comprises:
removing said metallic monolith from the polisher;
spraying a cleaning liquid over entire surface of said metallic monolith;
allowing said metallic monolith to dry;
rinsing said metallic monolith with a solvent; and
wiping the polisher using cold water and a paper towel.

12. The process of claim 11 wherein said cleaning liquid comprises ammonia and water.

13. The process of claim 11 wherein said solvent is acetone.

14. A process for producing an optical surface on a metallic monolith, which process comprises:
providing a metallic monolith;
pre-polishing a surface of the metallic monolith to produce a pre-polished surface having a surface roughness of not more than 100 angstroms rms with a surface accuracy in terms of surface figure error of not more than about one-half of a wave peak-to-valley;
refining the pre-polished surface by rubbing thereof with an abradant in combination with a polishing agent, the abradant comprising diamond particles, and the polishing agent comprising an aqueous dispersion of abrasive particles, a catalyst, and an organic solvent, for a period of time sufficient to produce a refined surface showing no rainbow effect or diffraction;
cleaning the refined surface and a polisher to remove said abradant and said polishing agent therefrom;
polishing the cleaned surface with the polishing agent to produce a polished surface having a predetermined surface roughness with a surface accuracy; and
cleaning the polished surface to remove the polishing agent therefrom.

15. The process of claim 14 including the additional steps of
i. diluting said polishing agent with water;
ii. polishing the pre-polished surface with said diluted polishing agent; and
iii. sequentially repeating steps i and ii to produce a polished surface having a surface having a predetermined surface roughness with a surface accuracy,
wherein the mixing proportions of said polishing agent and said diluting water are 100–50% and 0–50% by weight, respectively, based on the total weight of the diluted polishing agent.

16. The process of claim 15, wherein the polishing of the pre-polished surface with the polishing agent is effected by the method of random motion polishing.

17. The process of claim 14, wherein the pre-polishing of the surface of the metallic monolith is effected by diamond turning.

18. The process of claim 17, wherein the polishing agent comprises carbon black, ammonium hydroxide, phenol, ethylene glycol and water.

19. The process of claim 18, wherein carbon black, ammonium hydroxide, phenol, ethylene glycol and water are present in the polishing agent in amounts sufficient to provide the following respective percentages by weight, based on the total weight of the polishing agent: 7–8%, 1–2%, 0.2–1%, 1–2%, and 85–90%.

20. The process of claim 19, wherein the polishing agent is india ink.

21. The process of claim 17, wherein the metallic monolith is aluminum.

22. The process of claim 21, wherein the aluminum is 6061T6 aluminum.

23. The process of claim 17 wherein the size of said diamond particles is within the ranges of 0.25 to 0.5 microns.

24. The process of claim 17 wherein the time period for said refining process with said diamond particles is about 15 minutes.

25. The process of claim 14 including the additional step of:
cleaning said metallic monolith and said polisher; and
measuring the surface of said metallic monolith for verifying whether predetermined values of surface roughness and surface accuracy have been obtained.

26. The process of claim 25 wherein said step of cleaning said metallic monolith and the polisher comprises:
removing said metallic monolith from the polisher;
spraying a cleaning liquid over entire surface of said metallic monolith;
allowing said metallic monolith to dry;
rinsing said metallic monolith with a solvent; and
wiping the polisher using cold water and a paper towel.

27. The process of claim 26 wherein said cleaning liquid comprises ammonia and water.

28. The process of claim 27 wherein said solvent is acetone.

* * * * *